(12) United States Patent
Kwon

(10) Patent No.: US 11,032,821 B2
(45) Date of Patent: **\*Jun. 8, 2021**

(54) METHOD AND APPARATUS FOR TRANSMITTING BUFFER STATUS REPORT IN WIRELESS COMMUNICATION SYSTEM SUPPORTING DEVICE TO DEVICE COMMUNICATION

(71) Applicant: Innovative Technology Lab Co., Ltd., Seoul (KR)

(72) Inventor: Ki Bum Kwon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,140

(22) Filed: Jul. 10, 2019

(65) Prior Publication Data
US 2019/0335465 A1    Oct. 31, 2019

Related U.S. Application Data

(63) Continuation of application No. 15/722,226, filed on Oct. 2, 2017, now Pat. No. 10,397,925, which is a
(Continued)

(30) Foreign Application Priority Data

Aug. 8, 2014    (KR) .......................... 10-2014-0102091

(51) Int. Cl.
*H04W 72/02* (2009.01)
*H04W 72/04* (2009.01)
(Continued)

(52) U.S. Cl.
CPC ....... *H04W 72/0453* (2013.01); *H04L 45/302* (2013.01); *H04W 28/0278* (2013.01);
(Continued)

(58) Field of Classification Search
CPC . H04W 28/0278; H04W 72/02; H04W 72/04; H04W 72/0406; H04W 72/0453;
(Continued)

(56) References Cited

U.S. PATENT DOCUMENTS

2013/0109301 A1    5/2013   Hakola et al.
2014/0342735 A1    11/2014  Liao
(Continued)

OTHER PUBLICATIONS

International Search Report for International Patent Application No. PCT/KR2015/008277, dated Nov. 27, 2015.
Written Opinion for International Patent Application No. PCT/KR2015/008277, dated Nov. 27, 2015.
NEC, "D2D Discovery Resource Allocation under Network Coverage", R1-140494, 3GPP TSG RAN WG1 Meeting #76, Prague, Czech Republic, Feb. 10-14, 2014, pp. 1-3, 3GPP.
(Continued)

*Primary Examiner* — Harun Chowdhury

(57) ABSTRACT

A method of supporting a buffer status report associated with a device-to-device (D2D) communication includes: establishing an RRC connection with an eNB; receiving, by a UE, configuration information associated with a D2D communication from the eNB, the configuration information including information of a resource selection mode for a D2D data transmission, the information of a resource selection mode indicating a resource pool from which the UE selects a resource for a D2D data transmission to another UE; identifying a D2D target identity of at least one target UE to which the UE transmits D2D data by performing a D2D discovery procedure; setting an RRC message to be transmitted to the eNB, the RRC message including information of the identified D2D target identity; and transmitting the RRC message to the eNB, the information of the identified D2D target identity being transmitted through UEinformation message for a D2D data transmission.

16 Claims, 12 Drawing Sheets

Related U.S. Application Data continuation of application No. 14/821,661, filed on Aug. 7, 2015, now Pat. No. 9,814,045.

(51) Int. Cl.
| | | |
|---|---|---|
| *H04W 76/14* | (2018.01) | |
| *H04L 12/725* | (2013.01) | |
| *H04W 28/02* | (2009.01) | |
| *H04W 76/27* | (2018.01) | |
| *H04W 76/11* | (2018.01) | |

(52) U.S. Cl.
  CPC ........... *H04W 72/02* (2013.01); *H04W 76/14* (2018.02); *H04W 76/27* (2018.02); *H04W 76/11* (2018.02)

(58) Field of Classification Search
  CPC ... H04W 76/023; H04W 76/14; H04W 76/27; H04L 45/302
  USPC .......................... 370/252, 328, 329
  See application file for complete search history.

(56) References Cited

U.S. PATENT DOCUMENTS

| | | | |
|---|---|---|---|
| 2016/0007336 A1 | 1/2016 | Fukuta et al. | |
| 2016/0050558 A1 | 2/2016 | Wallentin et al. | |
| 2016/0143080 A1* | 5/2016 | Enomoto | H04W 76/14 370/329 |
| 2016/0183239 A1* | 6/2016 | Lee | H04W 72/0453 370/329 |
| 2016/0212682 A1 | 8/2016 | Chung et al. | |
| 2017/0055307 A1* | 2/2017 | Cao | H04W 76/14 |

OTHER PUBLICATIONS

Intel Corporation, "On Type 1 D2D Discovery Resource Allocation", R1-141162, 3GPP TSG RAN WG1 Meeting #76bis, Shenzhen, China, Mar. 31-Apr. 4, 2014, pp. 1-5, 3GPP.

Intel Corporation, "BSR reporting for D2D communication", R2-142048, 3GPP TSG-RAN WG2 Meeting #86, Seoul, Korea, May 19-23, 2014, pp. 1-2, 3GPP.

Huawei et al., "Design of D2D BSR and D2D MAC PDU", R2-142228, 3GPP TSG-RAN WG2 Meeting #86, Seoul, Korea, May 19-23, 2014, pp. 1-7, 3GPP.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.2.0, Jun. 2014, pp. 1-215, 3GPP Organizational Partners.

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.2.0, Jun. 2014, pp. 1-57, 3GPP Organizational Partners.

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.2.0, Jun. 2014, pp. 1-365, 3GPP Organizational Partners.

Office Action for Chinese Patent Application No. 201580042502.3. dated Oct. 11, 2019.

Extended European search report of European Patent Application No. 15 829 785.3. dated Mar. 2, 2018.

\* cited by examiner

FIG. 5
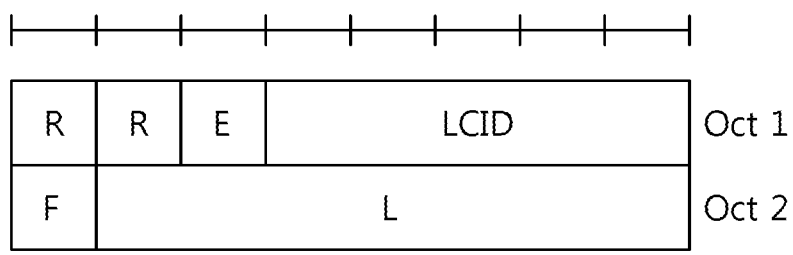
R/R/E/LCID/F/L sub-header with 7-blits L field
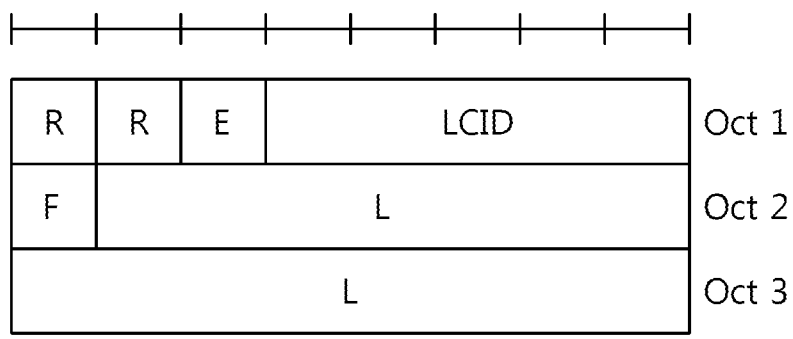
R/R/E/LCID/F/L sub-header with 15-blits L field
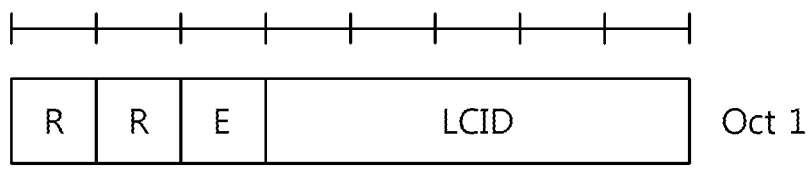
R/R/E/LCID sub-header

FIG. 6
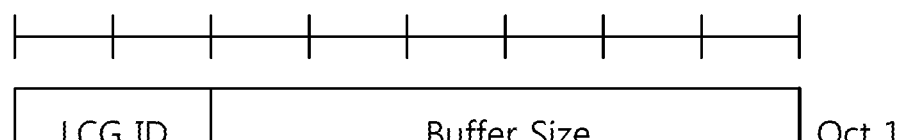
(a)
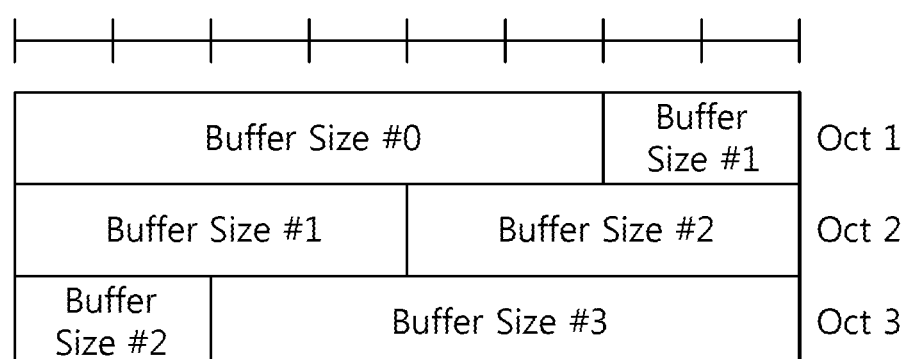
(b)

METHOD AND APPARATUS FOR TRANSMITTING BUFFER STATUS REPORT IN WIRELESS COMMUNICATION SYSTEM SUPPORTING DEVICE TO DEVICE COMMUNICATION

CROSS-REFERENCE TO RELATED APPLICATIONS

This application is a continuation of U.S. patent application Ser. No. 15/722,226, filed on Oct. 2, 2017, which is a continuation of U.S. patent application Ser. No. 14/821,661, filed on Aug. 7, 2015, now issued as U.S. Pat. No. 9,814,045, which claims priority from and the benefit of Korean Patent Application No. 10-2014-0102091, filed on Aug. 8, 2014, each of which is hereby incorporated by reference in its entirety.

BACKGROUND

1. Field

The present disclosure relates to wireless communication, and more particularly, to a method and an apparatus for transmitting, by a user equipment, information on the amount of data for device-to-device communication via a network through a buffer status report in a wireless communication system supporting device-to-device communication.

2. Discussion of the Background

Communication between terminals (Device to Device (D2D) communication) is a communication scheme that has been utilized from the days of analog radio set, which has a long history. However, communication between terminals in a wireless communication system is distinguished from existing communication between terminals.

The communication between terminals in the wireless communication system refers to communication in which terminals utilize transmission/reception technologies of the wireless communication system in the frequency band of the wireless communication system or other bands, and directly exchange user data without using an infrastructure (for example, a base station). This may allow wireless communication in an area outside the limited wireless communication infrastructure, and may reduce loads on the network of the wireless communication system.

Thus, there is a need for transmitting a buffer status report on D2D data to be transmitted in order to efficiently provide D2D communication in a wireless communication system.

SUMMARY

Exemplary embodiments relate to a method and an apparatus for transmitting, by a user equipment, information on the amount of data for device-to-device communication via a network through a buffer status report in a wireless communication system supporting device-to-device communication.

Exemplary embodiments relate to a method and an apparatus for supporting a buffer status report (BSR) associated with a device-to-device (D2D) communication.

An exemplary embodiment provides a method of supporting a buffer status report (BSR) associated with a device-to-device (D2D) communication, the method including: establishing a radio resource control (RRC) connection with an evolved NodeB (eNB); receiving, by a user equipment (UE), configuration information associated with a D2D communication from the eNB, the configuration information including information of a resource selection mode for a D2D data transmission, the information of a resource selection mode indicating a resource pool from which the UE selects a resource for a D2D data transmission to another UE; identifying a D2D target identity of at least one target UE to which the UE transmits D2D data by performing a D2D discovery procedure; setting an RRC message to be transmitted to the eNB, the RRC message including information of the identified D2D target identity; and transmitting the RRC message to the eNB, the information of the identified D2D target identity being transmitted through UEinformation message for a D2D data transmission.

An exemplary embodiment provides a user equipment (UE) to support a buffer status report (BSR) associated with a device-to-device (D2D) communication, the UE including: a wireless transceiver to establish a radio resource control (RRC) connection with an evolved NodeB (eNB), and to receive configuration information associated with a D2D communication from the eNB, the configuration information including information of a resource selection mode for a D2D data transmission, the information of a resource selection mode indicating a resource pool from which the UE selects a resource for a D2D data transmission to another UE; and a processor configured to identify a D2D target identity of at least one target UE to which the UE transmits D2D data by performing a D2D discovery procedure, to set an RRC message to be transmitted to the eNB, the RRC message including information of the identified D2D target identity. The wireless transceiver transmits the RRC message to the eNB, the information of the identified D2D target identity being transmitted through UEinformation message for a D2D data transmission.

According to an exemplary embodiment, in order to allocate a resource for device-to-device (D2D) in a wireless communication system, a procedure for a buffer status report on D2D data between a user equipment and a base station is defined, and operations and criteria of timers are defined at a buffer status report on D2D data, thereby efficiently utilizing limited wireless resources.

BRIEF DESCRIPTION OF THE DRAWINGS

FIG. 5 illustrates an example of an MAC sub-header in a wireless communication system according to an exemplary embodiment.

FIG. 6 illustrates a BSR MAC control element of a wireless communication system according to an exemplary embodiment.

DETAILED DESCRIPTION OF THE ILLUSTRATED EMBODIMENTS

Figure 1:
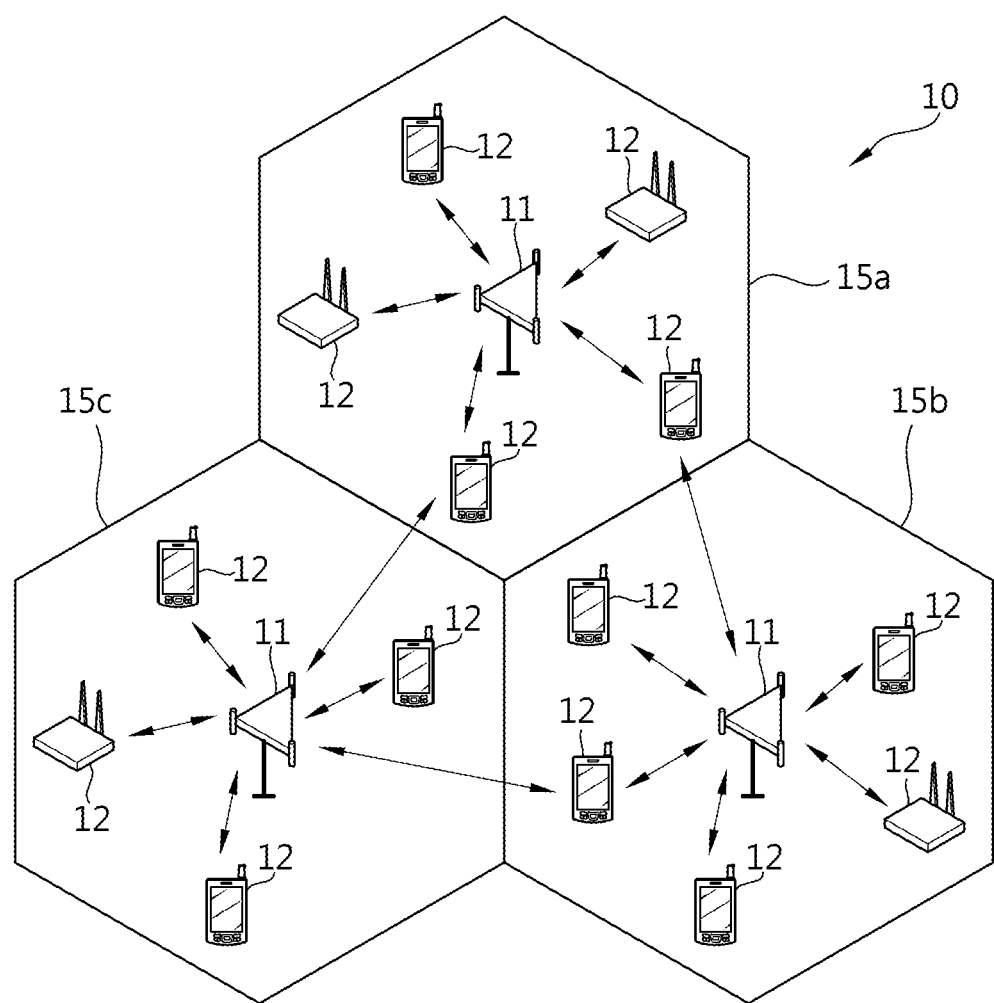
FIG. 1 illustrates a wireless communication system according to an exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. The present specification provides descriptions in association with a wireless communication network, and tasks executed in the wireless communication network may be performed in the process where a system (for example, a base station) that manages the corresponding wireless communication network controls the network and transmits data, or may be performed in a User Equipment (UE) that is wireless linked to the corresponding network and capable of communicating with the network system.

The present specification provides descriptions in association with a communication network, and tasks executed in the communication network may be performed in the process where a system (for example, a base station) that manages the corresponding communication network controls the network and transmits data, or may be performed in a User Equipment (UE) that is linked to the corresponding network.

FIG. 1 is a diagram illustrating a network architecture of a wireless communication system, according to one or more exemplary embodiments.

Referring to FIG. 1, a wireless communication system 10 may provide a communication service between a Base Station (BS) and a User Equipment (UE). In a wireless communication system, a UE and a BS may wirelessly transmit and receive data. Also, the wireless communication system may support Device-to-Device (D2D) communication between UEs. The wireless communication system that supports the D2D communication will be described later.

A BS 11 of the wireless communication system 10 may provide a communication service to a UE existing in a transmission coverage of the BS 11, through a predetermined frequency band. The coverage within which a BS provides a service is also referred to as a site. The site may include various areas 15a, 15b, and 15c, which may be referred to as sectors. The sectors included in the site may be identified based on different identifier from one another. Each sector 15a, 15b, and 15c may be construed as a part of the area that the BS 11 covers.

A base station 11 communicates with User Equipment (UE) 12 and may be referred to as eNB (evolved-NodeB), BTS (Base Transceiver System), Access Point, femto base station, Home nodeB, relay and Remote Radio Head (RRH). User equipment 12 (mobile station, MS) may be located at a certain location or mobile, and may also be referred to as different terms, including UE (user equipment), MT (mobile terminal), UT (user terminal), SS (subscriber station), wireless device, PDA (personal digital assistant), wireless modem, and handheld device. A cell inclusively refers to various coverage areas, such as mega cell, macro cell, micro cell, pico cell, and femto cell. A cell may be used as a term for indicating a frequency band that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model in association with a communication system. A physical layer belonging to the L1 among the layers, provides a information transfer service using a physical channel.

The physical layer is connected to a Media Access Control layer which is a higher layer, through a transport channel. Data is transferred through a transport channel between the MAC layer and the physical layer. The transport channel is classified based on a scheme of transmitting data through a radio interface. In addition, data is transferred through a physical channel between different physical layers (that is, between physical layers of a UE and an eNB). The physical channel may be modulated based on an Orthogonal Frequency Division Multiplexing (OFDM) scheme, and uses a space formed of time and frequencies, and a space formed of a plurality of antennas as radio resources.

For example, a Physical Downlink Control CHannel (PDCCH) among physical channels may inform a UE of resource allocation of a Paging CHannel (PCH) and a DownLink Shared CHannel (DL-SCH) and Hybrid Automatic Repeat Request (HARQ) information associated with a DL-SCH, and may deliver, to a UE, uplink scheduling grant which reports resource allocation of uplink transmission. A Physical Control Format Indicator CHannel (PCFICH) informs a UE of the number of OFDM symbols used for PDCCHs, and is transmitted for each subframe. A Physical Hybrid ARQ Indicator CHannel (PHICH) carries a HARQ ACK/NACK signal as a response to uplink transmission. In addition, a Physical Uplink Control CHannel (PUCCH) delivers HARQ ACK/NACK with respect to downlink transmission and uplink control information such as a scheduling request and a Channel Quality Indicator (CQI). A Physical Uplink Shared CHannel (PUSCH) delivers an UpLink Shared CHannel (UL-SCH). The PUSCH may include HARQ ACK/NACK and Channel State Information (CSI) such as a CQI.

A Data Link Layer, which is the second layer of the OSI model, includes a Radio Link Control (RLC) layer and a Packet Data Convergence Protocol (PDCP) layer.

The MAC layer may execute mapping between a logical channel and a transport channel, and execute multiplexing or demultiplexing between a transport channel of a MAC Service Data Unit (SDU) that belongs to the logical channel and a transport block provided in a physical channel. The MAC layer provides services to a Radio Link Control (RLC) layer through the logical channel. The logical channel is classified into a control channel for transferring control area information and a traffic channel for transferring user area information. For example, services provided from the MAC layer to a higher layer include data transmission or radio resource allocation.

The functions of the RLC layer include concatenation, segmentation, and reassembly of an RLC SDU. The RLC layer provides three types of operation modes, such as, a Transparent Mode (TM), an Unacknowledged Mode (UM) and an Acknowledged Mode (AM), to secure various Quality of Services (QoS) required by a Radio Bearer (RB).

The function of a Packet Data Convergence Protocol (PDCP) layer in the user plane includes user data transmission, header compression, and ciphering, and control plane data transmission and ciphering/integrity protection.

An RRC layer controls a logical channel, a transport channel, and a physical channel, in association with configuration, reconfiguration, and release of RBs. An RB indicates a logical path provided by a first layer (PHY layer) and a second layer (MAC layer, RLC layer, and PDCP layer), for transferring data between a UE and a network. A process of configuring an RB indicates a process that defines properties of radio protocol layer and a channel for providing a predetermined service, and sets corresponding detailed parameters and an operation method. An RB may be classified into a Signaling RB (SRB) and a Data RB (DRB). The SRB is used as a path for transmitting an RRC message and a Non-Access Stratum (NAS) message in the control plane, and the DRB is used as a path for transmitting user data in the user plane.

Hereinafter, the terms "SRB" and "DRB" are collectively referred to as the term "RB," which is to mean a DRB.

Figure 2:
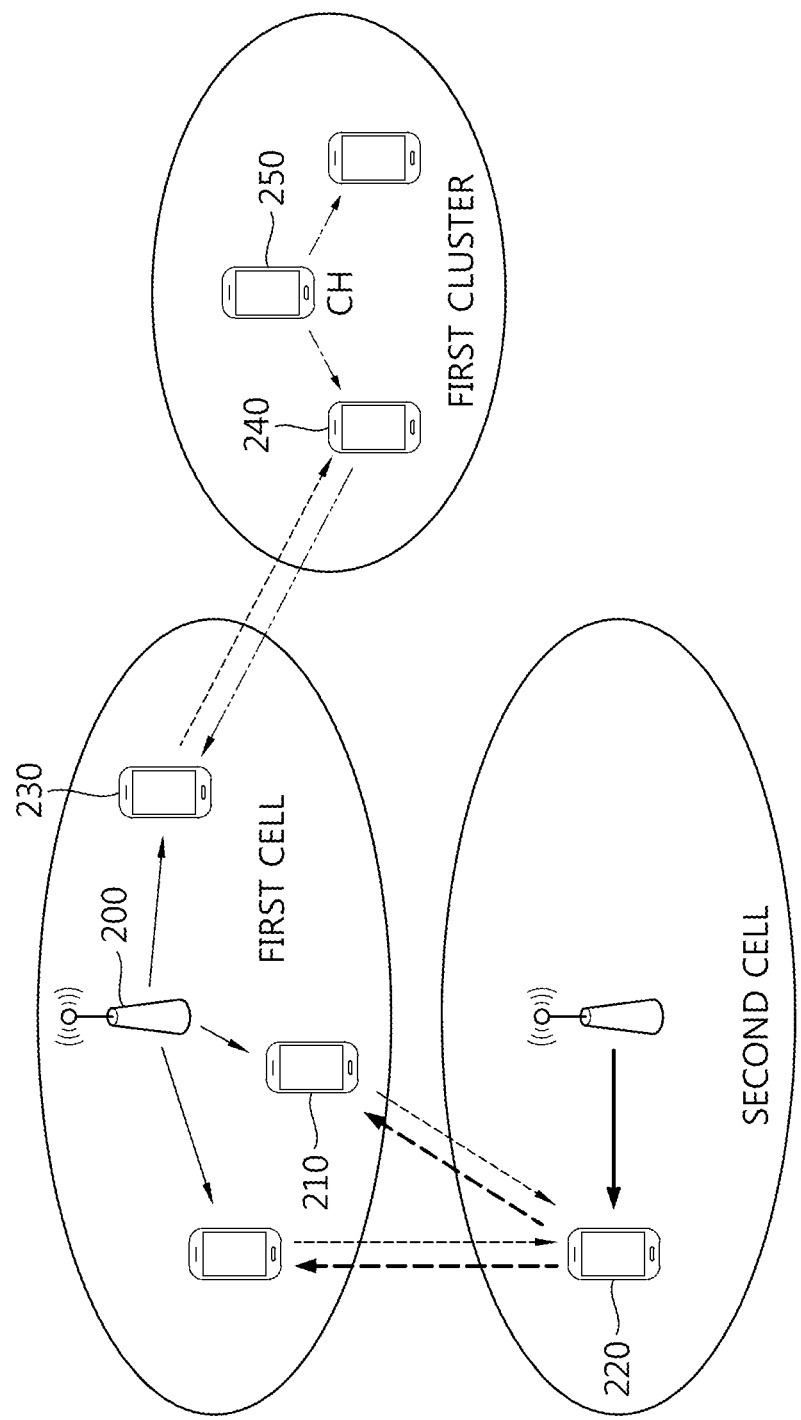
FIG. 2 illustrates the concept of cellular network-based D2D communication applied to an exemplary embodiment.

FIG. 2 illustrates the concept of cellular network-based D2D communication applied to an exemplary embodiment.

D2D communication refers to a technology which enables direct transmission and reception of data between UEs. Hereinafter, it is assumed that a UE supports D2D communication in an exemplary embodiment. The term "D2D" may be replaced with the expression "proximity-based service (ProSe)" or "ProSe-D2D." The term "ProSe" is used for D2D to mean that a proximity-based service may be added to the technology which enables direct transmission and reception of data between UEs, without changing the meaning of the technology.

Recently, methods for carrying out discovery and direct communication between in-coverage or out-of-coverage devices in a network have been studied for the purpose of public safety, etc. A UE performing D2D communication may be referred as a D2D UE. Further, a UE transmitting a signal based on a D2D communication may be referred to as a transmitting (Tx) UE, and a UE receiving a signal based on a D2D communication may be referred as a receiving (Rx) UE. A Tx UE may transmit a discovery signal, and an Rx UE may receive the discovery signal. A Tx UE and an Rx UE may exchange their roles therebetween. Further, a signal transmitted by a Tx UE can be received by two or more Rx UEs.

The load at a base station can be distributed and reduced if adjacent UEs perform D2D communications in a cellular system. Also, when adjacent UEs carry out D2D communications, UE's transmission power consumption and transmission latency may be reduced because UEs send data to a target located within a relatively short distance. Moreover, from the perspective the whole system, frequency utilization effectiveness is enhanced because existing cellular-based communication and D2D communication use the same resources.

D2D communication may be classified into a communication method of in-coverage UE, which is located in network coverage (base station coverage) and a communication method of out-of-coverage UE, which is located out of network coverage.

Referring to FIG. 2, the communication between a first UE 210 located in a first cell and a second UE 220 located in a second cell and the communication between a third UE 230 located in a first cell and a fourth UE 240 located in a first cluster may be D2D communication between UEs in a network coverage. The communication between the fourth UE 240 located in the first cluster and a fifth UE 250 located in the first cluster may be D2D communication between the UEs located outside a network coverage. The fifth UE 350 is the cluster header, and the cluster header may operate as an independent Synchronization Source (ISS) for synchronization of an out-of coverage UE.

The D2D communication may include a discovery process that executes discovery for communication between UEs and a direct communication process in which UEs transmit and receive control data and/or traffic data. The D2D communication may be used for various purposes. For example, D2D communication within a network coverage and D2D communication outside a network coverage may be used for public safety. The D2D communication outside a network coverage may be used for only the public safety. D2D communication in a BS coverage may be executed based on a BS.

For example, a BS 200 may transmit D2D resource allocation information to the first UE 210 located in the BS coverage. The D2D resource allocation information may include allocation information associated with a D2D communication resource for D2D communication between the first UE 210 and another UE (for example, a second UE 220).

The first UE 210 that receives the D2D resource allocation information from the BS, may transmit the D2D resource allocation information to the second UE 220 outside the BS coverage. The second UE 220 may be a UE located outside the BS coverage, from the perspective of the BS 200 of a first cell. The first UE 210 and the second UE 220 may execute D2D communication based on the D2D resource allocation information. Particularly, the second UE 220 may obtain information associated with the D2D communication resource of the first UE 210. The second UE 220 may receive traffic data and/or control data transmitted from the first UE 210, through a resource indicated by the information associated with the D2D communication resource of the first UE 210.

In the D2D communication, a UE may transmit control data to another UE. A separate channel (for example, a Physical Uplink Control Channel (PUCCH)) for transmitting control data may not be defined in the D2D communication. When the control channel is not defined in the D2D communication, a UE may use various methods for transmitting control data for D2D communication.

Here, in D2D communication, physical layer control data for synchronization includes information transmitted via a synchronization channel, for example, a physical D2D synchronization channel (PD2DSCH). The physical layer control data for data communication includes Scheduling Assignment (SA) information and may be provided via a channel having a format similar to or the same as a PUSCH format for D2D communication. In D2D communication, practical traffic data distinguished from the physical layer control data may be expressed as the term "D2D data."

Additionally, a method for transmitting upper layer control data other than the physical layer control data in D2D communication may be defined.

In a D2D communication, a UE may operate in a first transmission mode and a second transmission mode. The first transmission mode is a mode in which the UE is capable of carrying out D2D communication only when the UE has been assigned resources for a D2D communication from a base station, where a base station sends a D2D grant to a transmitting UE, which transmits a D2D signal to another UE. The D2D grant provides the transmitting UE with parameter information that needs to be decided by a base station among pieces of Scheduling Assignment (SA) information that needs to be obtained at a receiving UE for D2D data reception in a D2D communication, resource allocation information for the SA, and resource allocation information for data indicated by the SA. The parameter information that needs to be decided by the base station includes resource allocation information for data indicated by the SA. The D2D grant is forwarded to a transmitting UE in Downlink Control Information (DCI), and may be carried in Physical Downlink Control Channel (PDCCH) or Enhanced PDCCH (EPDCCH). The D2D grant may be control information with its distinct D2D purpose indicated by uplink grant or D2D-RNTI assigned to each UE. The D2D grant may be referred to as SA/data grant.

Meanwhile, the second transmission mode is a mode which enables the UE to perform D2D communication regardless of an instruction from the BS, in which the UE may autonomously select a resource for use among available radio resources for D2D communication to transmit D2D data. When information indicating that a particular cell in the BS is capable of supporting D2D through a System Information Block (SIB)/dedicated signaling and D2D resource pool information for the second transmission mode provided from the BS are present, the UE is allowed to operate in the second transmission mode only for the particular cell. However, the BS does not allow an operation in the second transmission mode, that is, when the information indicating that the particular cell in the BS is capable of supporting D2D is present but the D2D resource pool information for the second transmission mode is not provided from the BS, the UE is not allowed to operate in the second transmission mode. Further, when the D2D resource pool information for the second mode is valid only in the RRC connected mode, a UE in the RRC idle mode is not allowed to operate in the second transmission mode even in the presence of the D2D resource pool information for the second transmission mode. Here, when a UE is positioned out of a network service area, that is, when the UE is in an 'Any Cell Selection' mode in which the UE is in the RRC idle mode but selects no service-enabled cell, the UE may operate in the second transmission mode using the D2D resource pool information for the second transmission mode stored in an Universal Subscriber Identity Module (USIM) Integrated Circuit Card (UICC) of the UE or the D2D resource pool information for the second transmission mode received from the BS in a service area of a previous network.

In the wireless communication system, the UE reports a status of a buffer thereof to the BS in order to allocate a resource needed to transmit uplink (UL) data (data to be transmitted to the BS) present in the buffer of the UE, and the BS schedules a resource to be allocate to each UE based on the information on the status of the buffer reported by the UE.

Thus, in supporting D2D communication according to an exemplary embodiment, the BS may need to schedule resources necessary for in-coverage UEs to transmit data via D2D communication. To this end, the BS may need to know how much data to be transmitted via D2D communication (hereinafter, referred to as "D2D data") is in a UE buffer. Accordingly, there is suggested a method of a UE notifying the BS of how much data is in a UE buffer to be transmitted via D2D communication.

To this end, the wireless communication system according to an exemplary embodiment supports a form that a UE reports to the BS a buffer status regarding UL data (data to be transmitted to the BS) through a BSR and provides a form and criteria for reporting a buffer status regarding D2D data for efficient scheduling of resources needed to transmit D2D data.

Figure 3:
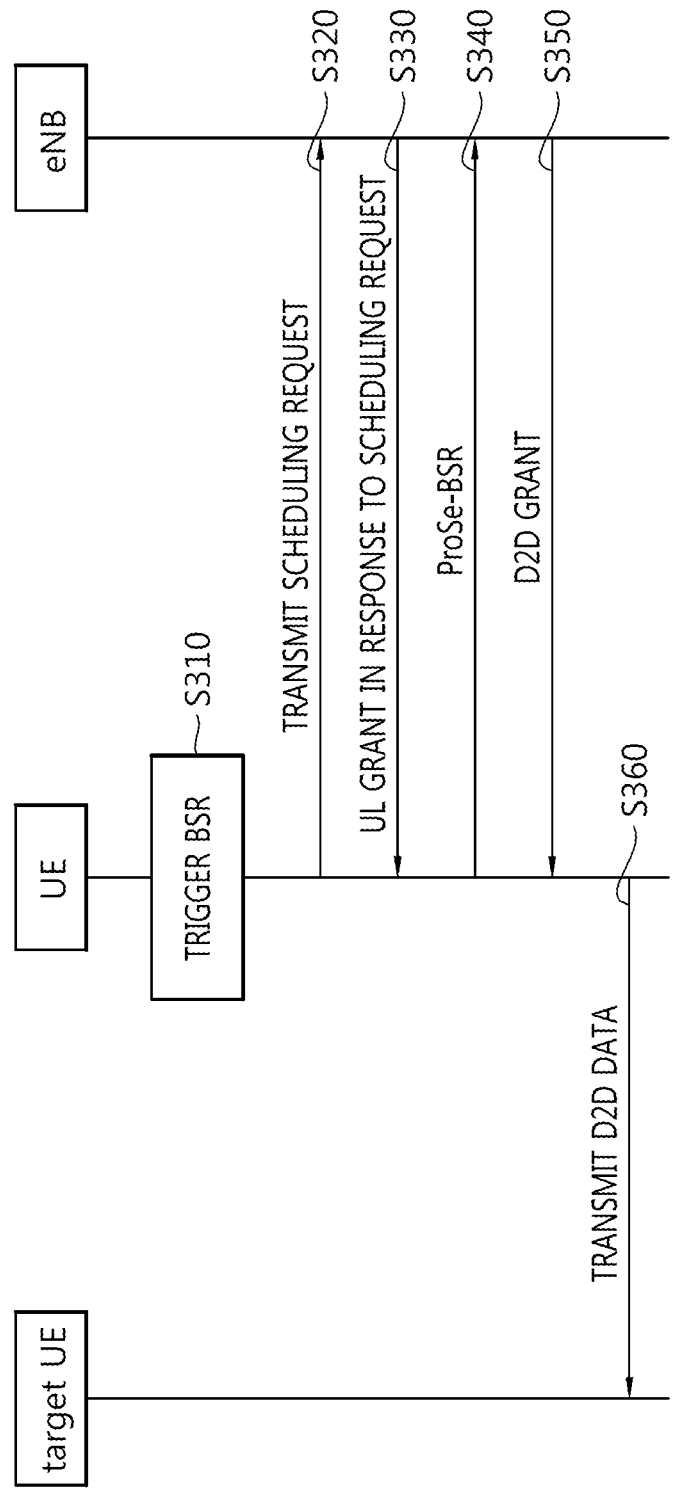
FIG. 3 illustrates a process of transmitting a ProSe-BSR according to an exemplary embodiment.

FIG. 3 illustrates a process that a UE transmits a ProSe-BSR to the BS in order to transmit D2D data in the first transmission mode in the wireless communication system according to an exemplary embodiment.

When a UE capable of performing D2D communication in the wireless communication system has data to transmit via a D2D link in a DRB configured for D2D, a BSR on the D2D data is triggered in operation S310. In an exemplary embodiment, a BSR on D2D data is referred to as a ProSe-BSR hereinafter. The ProSe-BSR refers to a BSR for D2D communication, which is distinguished from a BSR defined and used for the current wireless communication system.

When the ProSe-BSR is triggered, the UE transmits a scheduling request (SR) to the BS in order to induce allocation of a resource for transmission of the D2D data and ProSe-BSR in operation S320 and receives an UL grant in response to the SR from the BS in operation S330. Here, the SR is transmitted to the BS via a PUCCH. As the SR, an SR used in a conventional wireless communication system may be used, or a resource additionally allocated by the BS as an SR for D2D purposes, which is distinguished from the SR, may be used. When the SR for D2D purposes is distinguished by definition from the conventional SR, the SR may be distinguished as an ProSe-BSR. For convenience of description, an SR and a ProSe-BSR are collectively referred to as an SR.

When the SR is triggered, the SR is pending until the SR is cancelled. On the contrary, when the UL grant does not accommodate all pending data for transmission or a Media Access Control Protocol Data Unit (MAC PUD) is configured and includes a ProSe-BSR formed in such a buffer status that up to a last occurring event is included, the UE cancels all pending SRs and stops a timer (sr-ProhibitTimer) not to transmit the SRs.

In detail, when the SR is triggered and there is no currently pending SR, the UE sets an SR counter (SR_COUNTER) value to 0. However, in a case where the SR is pending, there is a valid PUCCH resource for sending the SR in a current Transmission Time Interval (TTI), the current TTI is not part of a measurement gap, and the sr-ProhibitTimer is not running, when the SR_COUNTER value is smaller than the maximum number of SR transmission times, the UE increases the SR counter value by 1, directs the physical layer to transmit an SR signal through the PUCCH, and starts the sr-ProhibitTimer. However, when the SR_COUNTER value is equal to or greater than the maximum number of transmission times, the UE notifies the RRC of release of the PUCCH and SRS and clears all configured DL allocations and UL grants. Then, the UE initializes a random access procedure and cancels all pending SRs.

Meanwhile, when the SR is pending but there is no available UL-SCH resource for transmission in any TTI, the UE initializes the random access procedure and cancels all pending SRs. Thus, the ProSe-BSR may be transmitted to the BS through the random access procedure.

When the UL grant in response to the SR is received, the UE transmits the ProSe-BSR to the BS in operation S340. When a D2D grant in response to the ProSe-BSR is received from the BS in operation S350, the UE transmits data to a destination UE using a resource allocated for transmission of the D2D data in operation S360. As described above, the ProSe-BSR is for the UE to notify the serving BS of information on the amount of data to be transmitted present in the D2D link buffer. In an exemplary embodiment, for example, the ProSe-BSR procedure is performed after the SR is transmitted. However, when the UE receives a sufficient UL grant to transmit the ProSe-BSR before transmission of the SR, the ProSe-BSR may be transmitted before transmission of the SR.

The BS configures a periodic BSR timer (periodicBSR-Timer) and a retransmission BSR timer (retxBSR-Timer) for the ProSe-BSR through a signaling defined in the RRC layer to control the ProSe-BSR procedure with respect to a logical channel in each UE. For each UE, a Logical Channel Group (LCG) may be optionally configured by an RRC signal by an eNB, and the ProSe-BSR may be performed for an LCG including a logical channel for D2D communication (hereinafter, "LCG"). The LCG is set separately from an LCG that is a destination of a BSR for the wireless communication system. For instance, an LCG for a ProSe-BSR and an LCG for a conventional BSR are set separately.

Here, the LCG as the destination of the BSR for the wireless communication system are formed of only logical channels (DCCH and DTCH) set for data transmission in the wireless communication system, and the logical channels (LCs) may have indexes of 0 to 11. On the contrary, the LCG as the destination of the BSR for D2D communication are formed of only LCs (PTCHs) set for D2D data transmission, and the LCs for D2D communication may have indexes of 0 to 11 independently of the indexes of the LCs for the wireless communication system (0 to 11).

Additionally, the BS may set the periodic timer/retransmission timer for the ProSe-BSR through an RRC with respect to each UE separately from a BSR for the wireless communication system.

A UE configures a ProSe-BSR based on pieces of buffered data in each LCG in each UE. Up to four LCGs may be configured in a UE. As a ProSe-BSR format, there may be a short BSR for reporting a buffer status corresponding to one LCG, a long BSR for reporting a buffer status corresponding to four LCGs, or a truncated BSR. A BSR format will be described later.

For the ProSe-BSR procedure, a UE may consider a suspended Radio Bearer (RB) as a ProSe-BSR destination and necessarily considers all unsuspended RBs as ProSe-BSR destinations. ProSe-BSRs may be divided into a regular ProSe-BSR, a padding ProSe-BSR, and a periodic ProSe-BSR.

The regular ProSe-BSR is triggered when data transmittable to a logical channel included in an LLG is present in an RLC entity or PDCP entity and there is UL data transmittable to a logical channel having a higher priority than other logical channels already including transmittable data. Further, the regular ProSe-BSR is also triggered when a retxBSR-Timer for a ProSe-BSR expires and a UE includes transmittable data in a logical channel of an LCG.

The padding ProSe-BSR is triggered when the number or padding bits remaining after allocation of a UL resource and a resource for padding BSR transmission for the wireless communication system is equal to or greater than a size for ProSe-BSR transmission.

Alternatively, the padding ProSe-BSR is triggered when the number or padding bits remaining after allocation of a UL resource and a resource for BSR transmission for the wireless communication system is equal to or greater than the size for ProSe-BSR transmission.

The periodic ProSe-BSR is triggered when a periodicBSR-Timer for the ProSe-BSR expires.

The regular ProSe-BSR and the periodic ProSe-BSR are transmitted in a long ProSe-BSR format when more than one LCG (at least two or more LCGs) have data to transmit in a TTI in which the ProSe-BSRs are transmitted. Otherwise (when only one LCG has data to transmit), the regular ProSe-BSR and the periodic ProSe-BSR may be configured and transmitted in a short BSR format. The padding ProSe-BSR is configured and transmitted in a truncated ProSe-BSR format with respect to an LCG including a logical channel having a top priority in data transmission when the number of padding bits included in an MAC PDU is equal to or greater than the total size of a short ProSe-BSR and a sub-header of the short ProSe-BSR but is smaller than the total size of a long ProSe-BSR and a sub-header of the long ProSe-BSR and more than one LCG has data to transmit in an TTI in which the padding ProSe-BSR is transmitted. In other cases, the padding ProSe-BSR is transmitted in a short ProSe-BSR format. Alternatively, when only a short ProSe-BSR format is possible as a ProSe-BSR format, the padding ProSe-BSR may always be transmitted in the short ProSe-BSR format.

Meanwhile, the padding ProSe-BSR is transmitted in a long ProSe-BSR format when the number of padding bits is equal to or greater than the total size of a long ProSe-BSR and a sub-header of the long ProSe-BSR. Alternatively, only a short ProSe-BSR format is possible as a ProSe-BSR format, the padding ProSe-BSR is always transmitted in the short ProSe-BSR.

Meanwhile, a UE performs the ProSe-BSR procedure when at least one ProSe-BSR is triggered and is not cancelled. When an UL resource for new transmission is allocated in a current TTI, the UE instructs multiplexing and assembly procedures for generation of a ProSe-BSR MAC control element, starts or restarts the periodicBSR-Timer for the ProSe-BSR, and starts or restarts the retxBSR-Timer for the ProSe-BSR. Here, a procedure of starting or restarting the periodicBSR-Timer for the ProSe-BSR is excluded when a truncated ProSe-BSR is generated. When the UL resource for new transmission is not allocated in the current TTI, a regular ProSe-BSR is triggered.

Here, one MAC PDU includes only one ProSe-BSR MAC control element even when a plurality of ProSe-BSRs is triggered. Also, when it is possible to transmit a regular ProSe-BSR or periodic ProSe-BSR, the regular ProSe-BSR or periodic ProSe-BSR is always a priority over the padding ProSe-BSR. Also, when reception of an indication which instructs transmission of new data with respect to all UL-SCHs is verified, the UE restarts the retxBSR-Timer. All triggered ProSe-BSRs need to be cancelled when the ProSe-BSRs are included in the MAC PDU.

The UE transmits one regular or periodic ProSe-BSR in one TTI. Also, according to an exemplary embodiment, the ProSe-BSR may be transmitted in the same TTI as a BSR of the wireless communication system. For example, in the same sub-frame (TTI), a ProSe-BSR for a D2D service and a conventional BSR for a general data service may be simultaneously transmitted. Here, information on the BRSs may be distinguished through LCIDs.

When the UE receives a request for transmission of a plurality of MAC PDUs in one TTI, one padding ProSe-BSR may be included in random MAC PDUs not including a regular or periodic ProSe-BSR. Thus, one padding ProSe-BSR may be included in random MAC PDUs including a regular or periodic ProSe-BSR for the wireless communication system. That is, although a padding BSR has a priority over a padding ProSe-BSR, the padding ProSe-BSR may be included first merely in a random MAC PDU including a regular or periodic BSR. The padding ProSe-BSR may also be included when a request for transmission of a single MAC PDU in one TTI is received. All ProSe-BSRs always reflect a buffer status after the UE configures MAC PDUs to transmit based on a previously received D2D grant on the basis of a TTI in which the ProSe-BSR is transmitted. Each LCG reports one buffer status value in each TTI, and the buffer status value is reported through a ProSe-BSR with respect to the LCG in all ProSe-BSRs. That is, in the same TTI, one ProSe-BSR value is transmitted by each LCG, and the buffer status with respect to the LCG value is the same in all ProSe-BSRs transmitted in the same TTI. Meanwhile, the padding ProSe-BSR is not allowed to cancel the regular or periodic ProSe-BSR. The padding ProSe-BSR is triggered with respect to a particular MAC PDU, and is cancelled when the particular MAC PDU is generated. Hereinafter, an MAC PDU will be described in detail.

Figure 4:
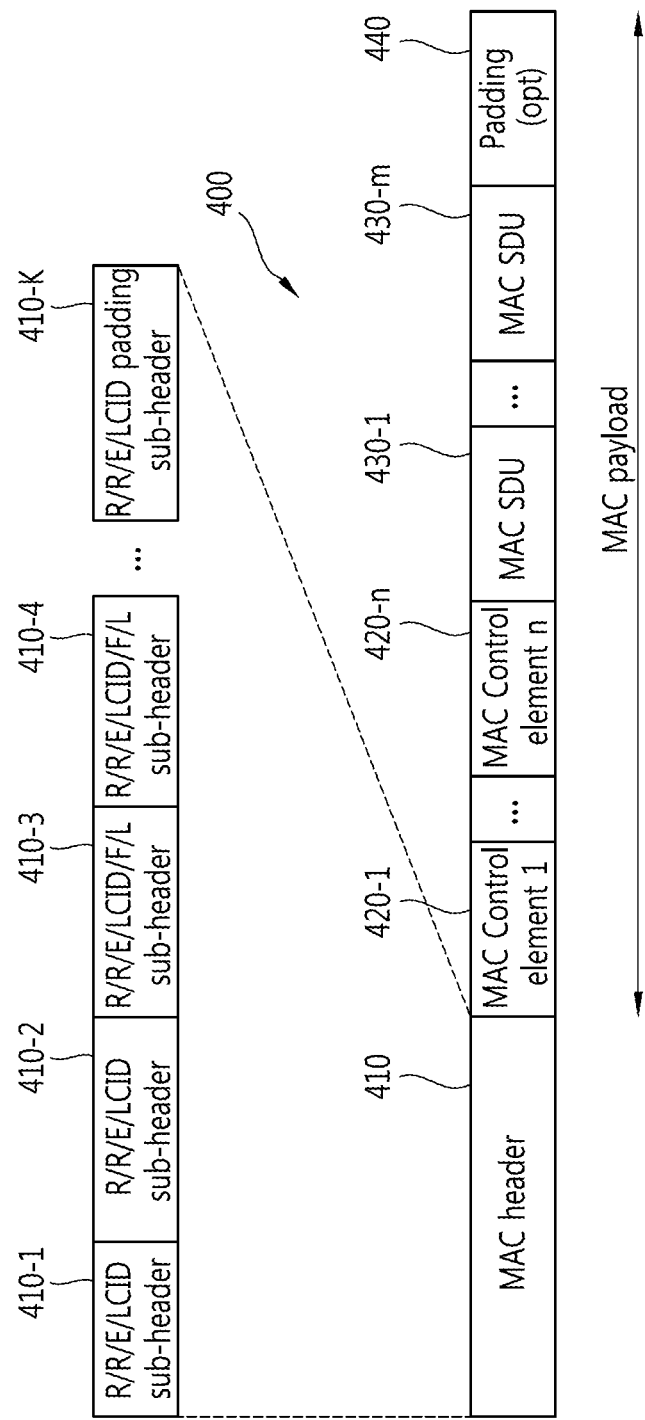
FIG. 4 illustrates a structure of a Media Access Control (MAC) Protocol Data Unit (PDU) in a wireless communication system according to an exemplary embodiment.

FIG. 4 is a diagram illustrating the architecture of a MAC PDU in a wireless communication system according to exemplary embodiments. FIG. 5 and FIG. 6 are diagrams illustrating an example of a MAC sub-header in a wireless communication system according to exemplary embodiments. The MAC PDU is also referred to as a transport block.

First, referring to FIG. 4, a MAC PDU 400 including a MAC header 410, n MAC control elements 420-1, . . . , and 420-n, m MAC Service Data Units (SDU) 430-1, . . . , and 430-m, and a padding 440, is illustrated. The MAC PDU 400 is formed of the MAC header 410, zero or at least one MAC control element 420-1, . . . , and 425-n, zero or at least one MAC SDU 430-1, . . . , and 430-m, and the padding 440. The size of the MAC header 410 and the size of the MAC SDU 430-1, . . . , and 430-m may vary.

The MAC header 410 includes at least one sub-header 410-1, 410-2, 410-3, 410-4, . . . , and 410-k, and each sub-header 410-1, 410-2, 410-3, 410-4, . . . , and 410-k corresponds to a MAC control element 420-1, . . . , and 420-n, a MAC SDU 430-1, . . . , and 430-m, or a padding 440. The sequence of the sub-header 410-1, 410-2, 410-3, 410-4, . . . , and 410-k is arranged to be identical to the sequence of MAC control element 420-1, . . . , and 420-n, MAC SDU 430-1, . . . , and 430-m, or padding 440, which the sub-header corresponds to in the MAC PDU 400.

Each sub-header 410-1, 410-2, 410-3, 410-4, . . . , and 410-k may include 6 fields, that is, R, R, E, LCID, F, and L fields, or may include 4 fields, that is, R, R, E, and LCID fields. A sub-header including 4 fields is a sub-header corresponding to the MAC control element 420-1, . . . , and 420-n or the padding 440, and a sub-header including 6 fields is a sub-header corresponding to the MAC SDU 430-1, . . . , and 430-m.

The MAC control element 420-1, . . . , and 420-n is a control message generated by a MAC layer, and is located before the MAC SDU 430-1, . . . , and 430-m. The MAC SDU 430-1, . . . , and 430-m corresponds to an RLC PDU that is transferred from a Radio Link Control (RLC) layer. The padding 440 is a predetermined number of bits added to maintain the size of the MAC PDU 400, and may always be added to the end of the MAC PDU 400 except for the case that requires a padding of 1 byte or 2 bytes. A UE disregards the value of the padding 440, no matter what the value is. The MAC control element 420-1, . . . , and 420-n, the MAC SDU 430-1, . . . , and 430-m, and the padding 440 together are referred to as a MAC payload.

FIG. 5 illustrates the architecture of the MAC sub-header including 6 fields (R, R, E, LCID, F, and L) and the architecture of the MAC sub-header including 4 fields (R, R, E, and LCID). Hereinafter, the fields included in the MAC sub-header will be described in detail.

A Logical Channel ID (LCID) field is to identify the logical channel of a corresponding MAC SDU, or to identify the type of a corresponding MAC control element or padding, which has a length (size) of 5 bits. The LCID field is included in a single MAC SDU, a single MAC control element, or a padding included in a MAC PDU.

A new LCID for a ProSe-BSR newly defined according to an exemplary embodiment may be included and transmitted. For example, LCIDs as illustrated in Tables 2 to 4 below may be included and transmitted.

A Length (L) field is a field that identifies the length of a corresponding MAC SDU or identifies the length of a variable-sized MAC control element, and the length of the L field may be indicated by a Format (F) field. FIG. 5 illustrates a sub-header when the L field has a length of 7 bits and a sub-header when the L field has a length of 15 bits.

An F field is a field to identify the length of an L field, and may have a length of 1 bit. When the length of a MAC SDU or a varied-sized MAC control element is less than 128 bytes, the value of the F field may be set to "0". For the rest cases, the value of the F field is set to "1".

An Extension (E) field is a flag to identify whether other fields exist in a MAC header. When the value is set to "1", it indicates that at least another set of R/R/E/LCID fields exists. When the value is set to "0", it indicates that a MAC SDU, a MAC control element, or a padding begins from a subsequent byte.

A Reserved (R) field is a reserved field, which is set to "0".

FIG. 6 illustrates a BSR MAC control element of the wireless communication system according to an exemplary embodiment.

Referring to FIG. 6, an MAC control element (a) of a short BSR and truncated BSR includes one LCG ID field and one buffer size (BS) field corresponding to the LCG ID field. An MAC control element (b) of a long BSR includes four buffer size fields corresponding to four LCG IDs (#0 LCG ID to #3 LCID ID). A BSR format is identified with an LCID value included in a sub-header of an MAC PDU. The LCID value for an uplink may be the values included in Table 1.

TABLE 1

| Index | LCID values |
|---|---|
| 00000 | CCCH |
| 00001-01010 | Identity of the logical channel |
| 01011-11010 | Reserved |
| 11011 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

An LCG ID field is for identifying a logical channel group via which a buffer status is reported to the BS and has a two-bit length. A buffer size field is for identifying the total amount of available data for all logical channels in an LCG after all MAC PDUs to be transmitted in one TTI are established and includes information on all data to be transmittable in the RLC layer and PDCP layer. Here, an RLC header and a PDCP header are not considered in calculating the buffer size. The buffer size field has a six-bit length.

Figure 7:
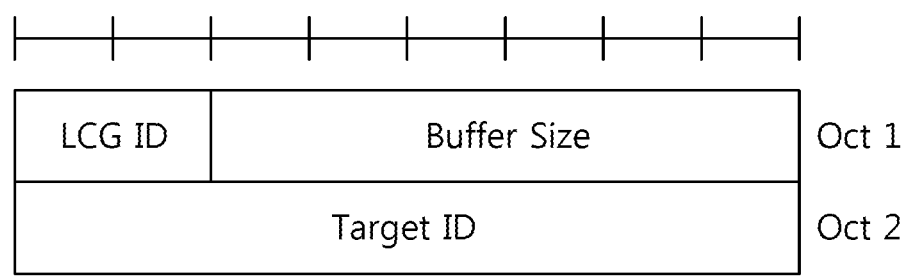
FIG. 7 illustrates a BSR MAC control element for D2D communication according to an exemplary embodiment.

FIG. 7 illustrates a BSR MAC control element for D2D communication according to an exemplary embodiment. Hereinafter, a method of notifying a BS of information on a destination to which D2D data is transmitted when a UE transmits a BSR on the D2D data in the UE will be described.

A UE supporting D2D communication may perform D2D communication when a UE user sets up the UE to be ready for D2D communication through a user interface (UI). Alternatively, a network (for example, a D2D server managing a ProSe ID and a ProSe Application ID of a UE using D2D communication, a serving BS of the UE, or the like) may ultimately determine availability of D2D communication of the UE set up by the UE user to be ready for D2D communication. That is, although the UE is set up by the UE user to be ready for D2D communication, the UE may perform D2D communication only when the network allows the UE to perform D2D communication. Information on availability of D2D communication may be displayed on a screen of the UE.

A resource for D2D communication may be allocated by a UE serving to allocate a resource for D2D communication in D2D communication (hereinafter, cluster head) or by a BS. In this case, a UE needs to transmit a BSR on D2D data to the BS or the cluster head when D2D communication is performed. For convenience of description, the BS and the cluster header are collectively referred to as a BS hereinafter.

Further, a different LCID from that of the BSR for the conventional UL data may be used for the ProSe-BSR. For instance, the ProSe-BSR may be allocated a new LCID to distinguish a short ProSe-BSR, a truncated ProSe-BSR, and a long ProSe-BSR. Alternatively, one ProSe-BSR format may be used as a BSR on D2D data.

When one ProSe-BSR format is used as a BSR on D2D data, the BSR on the D2D data may be allocated LCIDs to indicate a ProSe-BSR as illustrated in Table 2.

TABLE 2

| Index | LCID values |
|---|---|
| 00000 | CCCH |
| 00001-01010 | Identity of the logical channel |
| 01011-10111 | Reserved |
| 11000 | ProSe-B SR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The BS may identify based on an LCID as in Table 2 whether a received MAC control element is a BSR on UL data or BSR on D2D communication. However, when a ProSe-BSR is transmitted to the BS in a form of a BSR MAC control element for UL data as in FIG. 6, the BS identifies only the amount of D2D data to be transmitted by the UE but does not identify a destination of D2D data to be transmitted and thus does not identify which UE a resource is preferentially allocated.

Thus, according to a first embodiment, as shown in FIG. 7, the UE may configure an MAC control element for a ProSe-BSR to include ID information on a destination to receive D2D data (hereinafter, "target ID"). Hereinafter, a target ID, which will be described, may include a single UE or a UE group which receives D2D data or all UEs as broadcast targets. The target ID may also be referred to as a ProSe ID, which may be used for a second layer (MAC, RLC, and PDCP) of a UE.

Referring to FIG. 7, a ProSe-BSR may include at least one LCG ID field, buffer size field, and target ID field. An LCG ID may have any value of 0, 1, 2, and 3 as in a conventional wireless communication system. A buffer size may also have the same value as a buffer size in the conventional wireless communication system. Although FIG. 7 illustrates, for example, a 16-bit ProSe-BSR, a ProSe-BSR may be configured with 24 bits including a 16-bit target ID field as necessary.

As such, when the UE transmits a ProSe-BSR including a target ID field, the BS may recognize that an LCG ID and a target ID included in the ProSe-BSR have a mapping relationship. Here, information on a destination to be set with each target ID may be stored in advance in the BS.

Meanwhile, since up to four LCGs may be configured in a UE, when there are more than four target IDs, the UE may not set up mapping relationships between all target IDs and LCGs. Thus, the UE may set up LCs for D2D (ProSe Communication Traffic Channels (PTCHs) in which data to be transmitted via D2D communication are present) to be mapped to one LCG by each combination of a source ID and a target ID. That is, LCs having the same source ID and the same target ID may be included in the same LCG. Here, since a source ID is always fixed in the position of the UE transmitting D2D data, an LCG may be configured depending on a target ID. Here, LCs having the same source ID and the same target ID may not always be configured in the same LCG. That is, particular LCs may not be included in the same LCG although the particular LCs have the same source ID and the same target ID. The UD may verify QoSs of LCs or uses for applications and determine whether BSRs on corresponding LCs are needed based on the QoSs and uses for applications. For example, the UE may map an LC, which is mapped to a voice service (push-to-talk service) which needs a quick response or a service which is for public safety and needs transmission of a mass of data (video streaming service for public safety), to at least one LCG in order to report the LC to the BS through a ProSe-BSR. For instance, the UE may map LCs for public safety a service to LCG=0 and LCs for a service which is not for a public safety service and needs a quick response to LCG=1.

Meanwhile, according to a second embodiment, when there is a new target ID to which a UE desires to transmit D2D data (for example, when there is a target ID added as a destination of transmitted D2D data through a D2D discovery procedure) or when the UE desires to change a target ID already mapped to an LCG, the UE may notify, through an RRC signaling, the BS of target IDs to which the UE desires to transmit data via D2D communication.

FIGS. 8 to 11 are flowcharts illustrating procedures for a BSR on D2D data according to exemplary embodiments.

Figure 8:
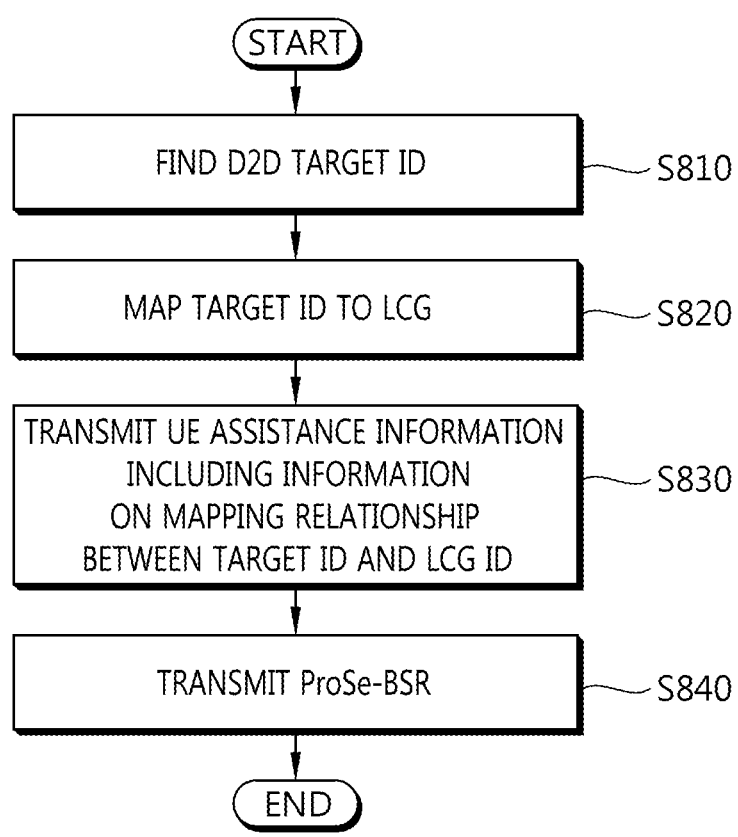
FIGS. 8 to 11 are flowcharts illustrating a procedure for a BSR on D2D data according to an exemplary embodiment.

Referring to FIG. 8, when a D2D target ID is found through a D2D discovery procedure in operation S810, a UE maps the target ID to an LCG in operation S820 and transmits information on a mapping relationship between the target ID and an ID of the LCG (LCG ID) to the BS using a UE Assistance Information message, thereby notifying the BS which target ID is mapped to which LCG in operation 830. For instance, when a plurality of D2D target IDs (for example, four or more D2D target IDs) are found, the UE selects four target IDs for D2D communication among the target IDs and map the respective target IDs to LCGs. Then, the UE transmits a UE Assistance Information message including information on mapping relationships between the target IDs and LCG IDs to the BS in operation S830, thereby notifying the BS which target ID is mapped to which LCG. The UE Assistance Information message includes a power preference indication of the UE and may be transmitted from the UE to the BS after an RRC connection reconfiguration procedure. The foregoing procedure may also be started by the UE when the UE desires to change the mapping relationship between the target ID of D2D communication and the LCG regardless of whether the UE finds a new D2D target ID.

In this case, since the BS already identifies the information on the mapping relationships between the target IDs and the LCG IDs through UE Assistance Information, the UE may not need to transmit information on a target ID mapped to a particular LCG to the BS when transmitting a BSR on D2D data mapped to the particular LCG. Thus, the UE may transmit a ProSe-BSR using the same MAC control element format as that for a conventional BSR on UL data as in FIG. 6 in operation S840.

When the ProSe-BSR is received from the UE, the BS may determine order of priority of target IDs with respect to resource allocation requested by the UE in view of equity to other UEs operating in the first transmission mode and QoS based on an LCG value included in the ProSe-BSR and the information on the mapping relationship between the target ID and the LCG ID and allocate a resource for D2D communication to the UE according to the order of priority.

Figure 9:
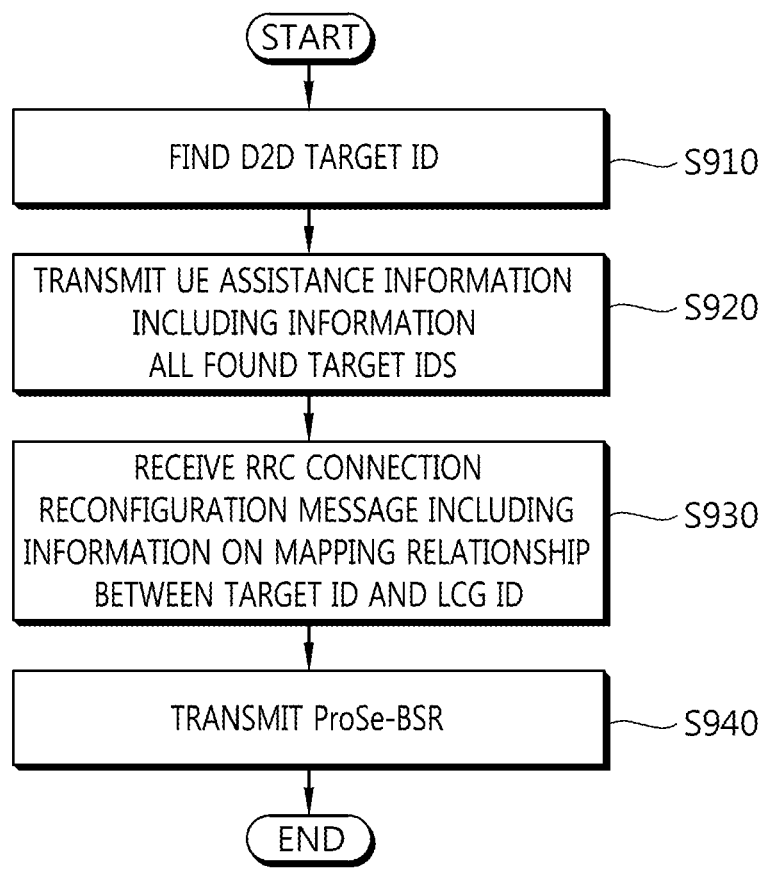
Figure 10:
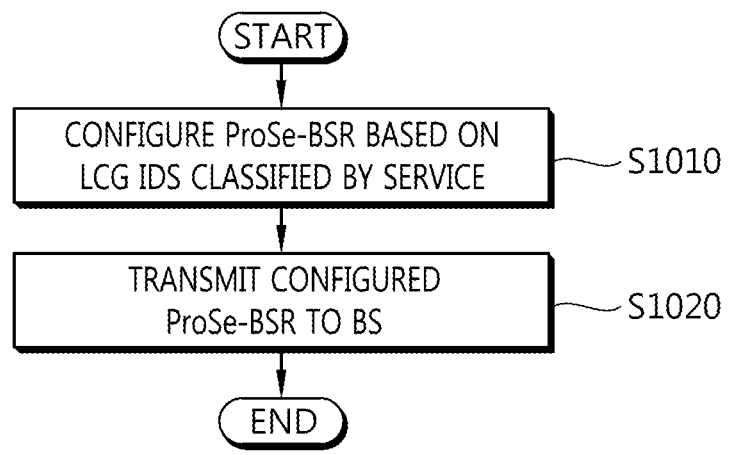
Figure 11:
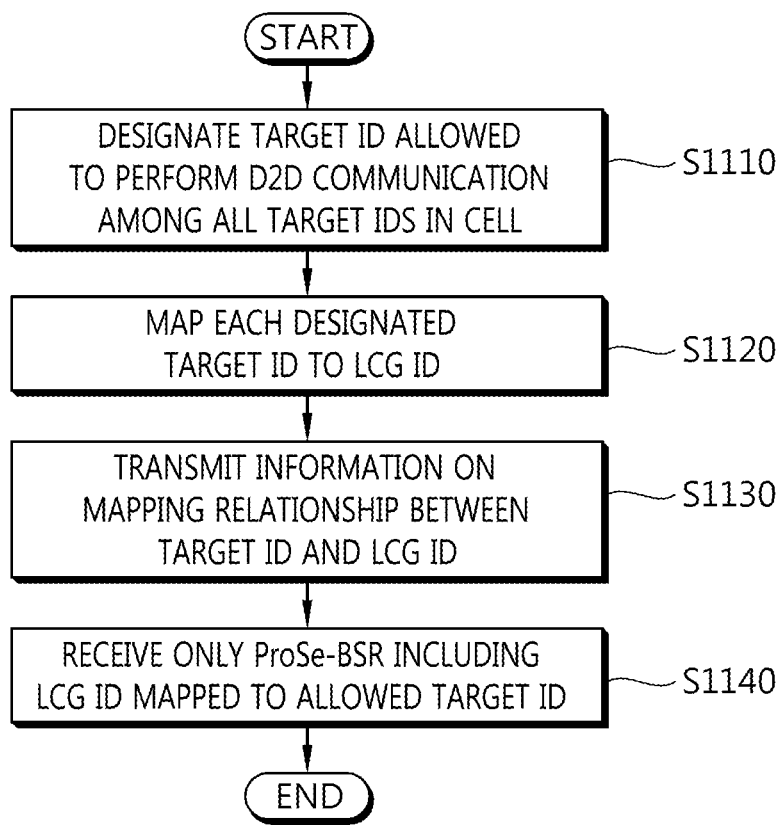

Meanwhile, referring to FIG. 9, when a D2D target ID is found through a D2D discovery procedure in operation S910, a UE may transmit information on all found target IDs to the BS using the UE Assistance Information message in operation S920. In this case, the BS may select four or less target IDs among the target IDs received from the UE and map the selected target IDs to respective LCGs. Subsequently, the BS may notify the UE of information on mapping relationships between the target IDs and LCG IDs through an RRC connection reconfiguration message. When the RRC connection reconfiguration message is received from the BS in operation S930, the UE may configure a ProSe-BSR using the information on the mapping relationships between the target IDs and LCG IDs included in the RRC connection reconfiguration message and transmit the configured BSR to the BS in operation S940. The foregoing procedure may also be started by the UE when the UE desires to exclude some of the identified D2D target IDs from target IDs of D2D communication regardless of whether the IDs are found. That is, a target ID to be excluded is excluded from objects to be reported.

In this case, since the BS already identifies the information on the mapping relationships between the target IDs and the LCG IDs, the UE may not need to include information on a target ID mapped to a particular LCG when configuring a BSR on D2D data mapped to the particular LCG. That is, the UE may transmit the ProSe-BSR using the same MAC control element format as that for a conventional BSR on UL data as in FIG. 6.

In a third embodiment, a UE may determine order of priority of D2D data to be transmitted depending on an application program or service type. In this case, since the UE determines the order of priority of D2D data, the BS may not need target ID information. However, the BS may compare service characteristics of pieces of D2D data reported by each UE and preferentially allocate a resource to a UE having higher QoS and urgency.

For example, when D2D services are classified into a public safety service and a general commercial service including a mobile communication voice service, game, and large file transfer, a first UE may transmit a ProSe-BSR including information indicating D2D data for a public safety service and a second UE may transmit a ProSe-BSR including information indicating D2D data for a general commercial service. In this case, the BS may preferentially allocate a resource for the D2D data for the public safety service. Here, the public safety service may refer to a series of state-level protection services for preventing risks caused by disasters and crimes, vandalism, and injuries. Police, a fire department, and organizations for disaster relief for public safety may be established at a state level, and UEs for communications between members in each organization may be connected to one another through different communication networks. Here, the UEs for communications between the members may be based on an LTE communication system.

As described above, an LCG ID may be used as information for separately indicating each service, and a fixed LCG ID may be set for each application program or service type. For example, an LCG ID of 3 may indicate a group of LCs including pieces of D2D data for public safety, and an LCG ID of 2 may indicate a group of LCs including pieces of D2D data for general commercial services. Meanwhile, the general commercial services may be subdivided into a general service and an ultra-low latency service, in which case an ID of 3 may indicate a group of LCs including pieces of D2D data for public safety, an ID of 2 may indicate a group of LCs including pieces of D2D data for the general service, and an ID of 1 may indicate a group of LCs including pieces of D2D data for the ultra-low latency service.

As such, when a scheduler of the UE is capable of determining the order of priority of the pieces of D2D data, the priorities of the pieces of D2D data may be divided depending on an application program or service type. Thus, the UE may configure a ProSe-BSR including one LCG ID indicating a top priority based on LCG IDs classified according to an application program or service or configure a ProSe-BSR including buffer size information on a plurality of LCG IDs in operation S1010. The UE may transmit the configured ProSe-BSR to the BS in operation S1020. To supports this, a ProSe-BSR configured as in Table 3 may be used as an example.

TABLE 3

| Index | LCID values |
|---|---|
| 00000 | CCCH |
| 00001-01010 | Identity of the logical channel |
| 01011-10101 | Reserved |
| 10110 | Short ProSe-BSR |
| 10111 | Truncated ProSe-BSR |
| 11000 | Long ProSe-BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In a fourth embodiment, a UE may determine the order of priority of pieces of D2D data using an LCID value for distinguishing an MAC CE, instead of an LCG ID, depending on an application program or service type. In this case, the UE may configure a ProSe-BSR including different LCID values depending on an application program or service type as in Table 4.

TABLE 4

| Index | LCID values |
|---|---|
| 00000 | CCCH |
| 00001-01010 | Identity of the logical channel |
| 01011-10101 | Reserved |
| 10110 | Ultra-low latency ProSe-BSR |
| 10111 | Normal ProSe-BSR |
| 11000 | Public safety ProSe-BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Meanwhile, the UE may operate in the second transmission mode (in which the UE is allowed to perform D2D transmission without being allocated a resource by the BS) only when information on a D2D resource pool is received from the BS through an SIB or dedicated signaling. However, the BS may notify the UE through the SIB or dedicated signaling that D2D communication is possible in a corresponding cell but may not provide information on a D2D resource pool for the second transmission mode. In this case, the UE needs to enter the RRC connected mode and operate in the first transmission mode in order to conduct D2D transmission. The UE transmits an RRC connection request message to the BS in order to enter the RRC connected mode, and the RRC connection request message may include information indicating that the request is made for a D2D operation. However, when the UE is in the RRC connected state, the UE may request the BS to allocate a D2D resource through an SR and ProSe-BSR.

According to a fifth embodiment, the BS may designate four or less target IDs with respect to a group (or UE) allowed to perform D2D communication among all target IDs in a cell in operation S1110. The reason why four or less target IDs are designated is because up to four LCG IDs may be set for a UE. The BS allows only a particular group (or UE) to perform D2D communication, because when there are a group (or UE) to perform D2D communication for public safety and a group (or UE) to perform D2D communication for other purposes (for example, commercial uses), it is necessary at a particular time to allow only D2D communication for public safety or with a higher priority. To this end, the BS may map the respective designated target IDs to LCG IDs in operation S1120 and transmit information on mapping relationships between the target IDs and the LCG IDs to UEs in the cell through a SIB or dedicated signaling (for example, an RRC connection reconfiguration message) in operation S1130. For instance, the BS may allocate an LCG ID of 0 to a target ID for broadcasting and other LCG IDs (1, 2, and 3) to target IDs corresponding to particular determined groups. Accordingly, the UEs in the cell of the BS may have the same mapping relationships between the target IDs and the LCG IDs.

When the information on the mapping relationships between the target IDs of targets allowed to conduct D2D communication in the cell of the BS and the LCG IDs is received the UEs may configure a BSR only on D2D data present in an LCG mapped to an allowed target ID. That is, all UEs in the cell may perform a ProSe-BSR procedure only with respect to the target ID allowed by the BS, and the BS may receive only a ProSe-BSR including an LCG ID mapped to the allowed target ID in operation S1140. Here, the ProSe-BSR may have a new ICID value for the ProSe-BSR as in Table 3 depending on a format thereof. Alternatively, a only single format having a single ICID value for the ProSe-BSR (for example, only short) as in Table 2 may be used.

Figure 12:
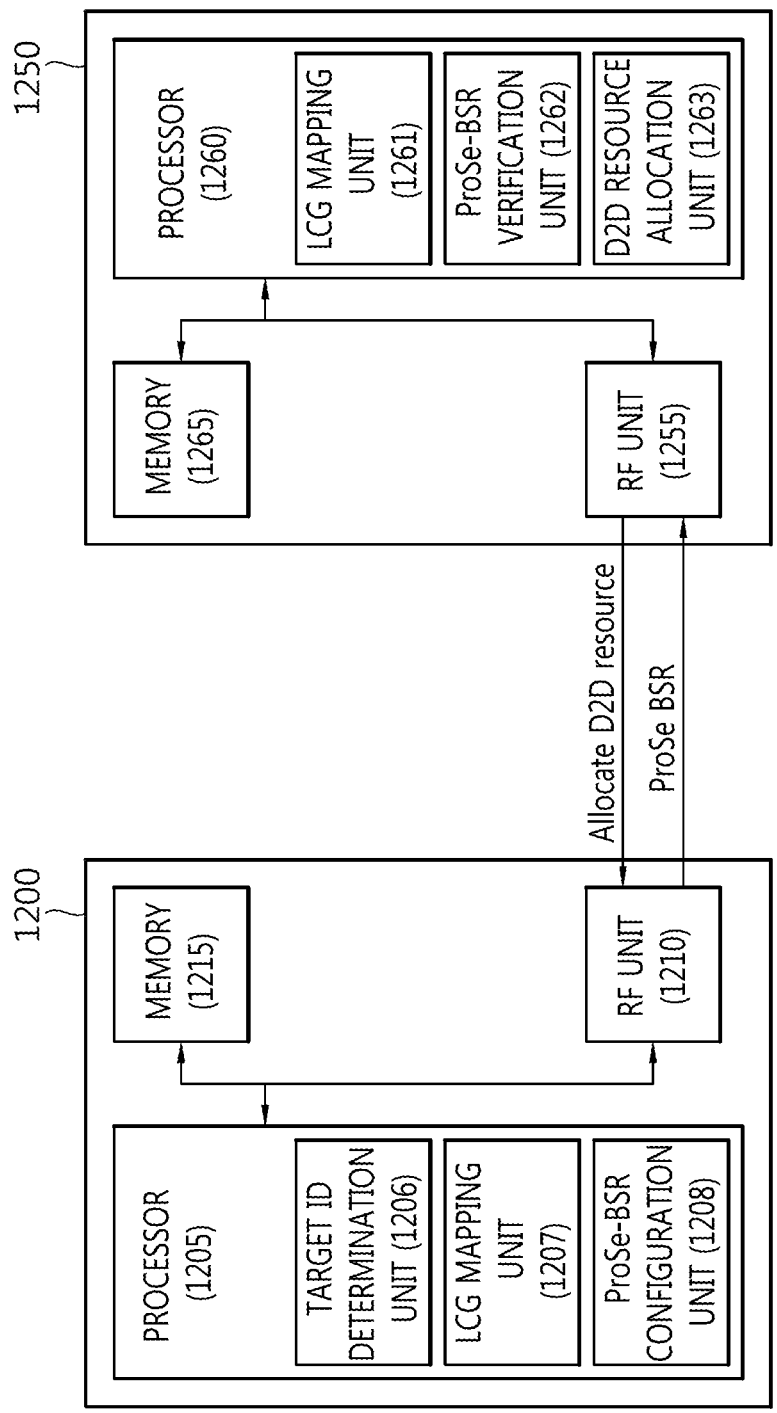
FIG. 12 is a block diagram illustrating a wireless communication system according to an exemplary embodiment.

FIG. 12 is a block diagram illustrating a wireless communication system according to an exemplary embodiment.

Referring to FIG. 12, the wireless communication system which supports D2D communication according to an exemplary embodiment includes a UE 1200 and a BS (or cluster head) 1250.

The UE 1200 may include a processor 1205, a radio frequency (RF) unit 1210, and a memory 1215. The memory 1215 may be coupled to the processor 1205 and store various pieces of information to operate the processor 1205. The RF unit 1210 may be coupled to the processor 1205 and may transceiver a wireless signal.

For example, the RF unit 1210 may receive an RRC connection reconfiguration message and an SIB described in the present specification from a BS 1250. Further, the RF unit 1210 may transmit an UL signal described in the present specification to the BS 1250.

The processor 1205 may implement functions, processes, and/or methods described herein. For example, the processor 1205 may perform operations illustrated in FIG. 8 through FIG. 10 and corresponding operations described herein.

In one example, the processor 1205 may include a target ID determination unit 1206, an LCG mapping unit 1207, and a ProSe-BSR configuration unit 1208. In this case, when a D2D target ID is found through a D2D discovery procedure, the target ID determination unit 1206 may determine whether to map the target ID to an LCG. Further, the target ID determination unit 1206 may also determine whether a mapping relationship between a target ID and an LCG is changed. The LCG mapping unit 1207 maps the target ID, which is determined by the target ID determination unit 120 to be mapped to an LCG, to the LCG. Information on a mapping relationship between the target ID and an LCG ID, which is generated by the LCG mapping unit 1207, may be transmitted to the BS 1250 by the RF unit 1210 using an UE Assistance Information message, and the BS 1250 may identify based on the message which target ID is mapped to which LCG. Meanwhile, the ProSe-BSR configuration unit 1208 may configure a ProSe-BSR in a form of an MAC control element shown in FIG. 6 or 7 when there is data to transmit via a D2D link in a DRB configured for D2D. The configured ProSe-BSR MAC control element may be transmitted by the RF unit 1210 to the BS 1250.

In another example, the processor 1205 may include a target ID determination unit 1206 and a ProSe-BSR configuration unit 1208. In this case, when a D2D target ID is found by the target ID determination unit 1206 or a mapping relationship between a target ID and an LCG needs changing, the RF unit 1210 may transmit information on the target ID to the BS using a UE Assistance Information message. In this case, the RF unit 1210 may receive information on a mapping relationship between the target ID and an LCG ID from the BS 1250 through an RRC connection reconfiguration message. The ProSe-BSR configuration unit 1208 may configure a ProSe-BSR using the information on the mapping relationship between the target ID and the LCG ID included in the RRC connection reconfiguration message.

In still another example, the processor 1205 may determine order of priority of D2D data to be transmitted depending on an application program or service type. In this case, the ProSe-BSR configuration unit 1208 of the processor 1205 may configure a ProSe-BSR including one LCG ID indicating a top priority based on LCG IDs classified by application program or service or configure a ProSe-BSR including buffer size information on a plurality of LCG IDs. Alternatively, the ProSe-BSR configuration unit 1208 may configure a ProSe-BSR having a different LCID value for an application or service type. That is, the ProSe-BSR configuration unit 1208 may configure a ProSe-BSR having an LCID value distinguished as in Tables 2 to 4.

Operations of the UE 1200 in all embodiments of the present specification may be implemented by the processor 1205.

The memory 1215 may store information on a mapping relationship between a target ID and an LCG ID according to the present specification or information on order of priority of D2D data and provide the information on the mapping relationship between the target ID and the LCG ID or the information on the order of priority of D2D data to the processor 1205 at a request of the processor 1205.

The base station (BS) 1250 may include an RF unit 1255, a processor 1260, and a memory 1265. The memory 1265 may be coupled to the processor 1260 and store various pieces of information to operate the processor 1260. The processor 1260 may functions, processes, and/or methods described herein. One or more exemplary embodiments illustrating the operation of a base station, e.g., the BS 1250, may be implemented by the processor 1260.

The processor 1260 generates an RRC connection reconfiguration message described in the present specification and schedules a resource for D2D communication based on information on a mapping relationship between a target ID and an LCG ID.

For example, the processor 1260 may include an LCG mapping unit 1261, a ProSe-BSR verification unit 1262, and a D2D resource allocation unit 1263. In this case, the LCG mapping unit 1261 may map a target ID to an LCG ID based on information (information on a mapping relationship between a target ID and an LCG ID) included in a UE Assistance Information message received from the UE 1200 through the RF unit 1225. The ProSe-BSR verification unit 1262 may verify an LCG value included in a ProSe-BSR when the ProSe-BSR is received from the UE 1200. The D2D resource allocation unit 1263 may allocate a resource for D2D communication to the UE 1200 according to order of priority determined in view of equity to other UEs operating in the first transmission mode and QoS on the basis of the information on the mapping relationship between the target ID and the LCG ID.

Alternatively, when a plurality of target IDs is received from the UE 1200, the LCG mapping unit 1261 may select four or less target IDs among the received target IDs and map the selected target IDs to LCGs, respectively. Then, the LCG mapping unit 1261 may notify the UE 1200 of information on mapping relationships between the target IDs and the LCG IDs through an RRC connection reconfiguration message.

According to an exemplary embodiment, a UE may include a wireless transceiver and one or more processors. The wireless transceiver may be the RF unit 1210 or may include the RF unit 1210. The one or more processors may be the processor 1205 or may include the processor 1205.

The wireless transceiver may establish a radio resource control (RRC) connection with an eNB, and receive configuration information associated with a D2D communication from the eNB. The configuration information may include information of a resource selection mode for a D2D data transmission, and the information of a resource selection mode indicates a resource pool from which the UE selects a resource for a D2D data transmission to another UE. The one or more processors may be configured to identify a D2D target identity of at least one target UE to which the UE transmits D2D data by performing a D2D discovery procedure, to set an RRC message to be transmitted to the eNB, the RRC message comprising information of the identified D2D target identity. The wireless transceiver transmits the RRC message to the eNB, the information of the identified D2D target identity being transmitted through UEinformation message for a D2D data transmission.

The one or more processors may initiate a procedure of setting the RRC message and transmitting the RRC message when a change of the D2D target identity to be included in the UEinformation message occurs. The UEinformation message may include mapping information between at least one D2D target identity and a group identity associated with the at least one D2D target identity.

The D2D target identity may be configured to be identified by Proximity Service (ProSe) Layer-2 identity. Prose layer-2 associated with the ProSe Layer-2 identity may include Media Access Control (MAC) layer, Radio Link Control (RLC) layer, and Packet Data Convergence Protocol (PDCP) layer.

The D2D target identity may be associated with a receiving terminal to receive D2D data transmitted from the UE, the receiving terminal including a UE, a UE group, or a broadcasting destination. The wireless transceiver reports, to the eNB, a BSR for a D2D data transmission. The BSR may include, for each D2D target identity group, group information of at least one D2D target identity and a buffer size field. The processor configures a Media Access Control Protocol Data Unit (MAC PDU) for the BSR by using logical channel group identity (LCG ID) for indicating a BSR for D2D data or LCG ID for indicating a truncated BSR. The RRC message is associated with a resource scheduling by the eNB, the resource scheduling indicating a resource for a D2D data transmission of the UE.

The wireless transceiver may receive a System Information Block (SIB) message from the eNB, the SIB message including information supporting a D2D data transmission of the UE.

The information supporting a D2D data transmission of the UE may indicate whether a specific cell supports a D2D data transmission, and the specific cell is associated with a frequency band through which the UE transmits D2D data.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method comprising:
   receiving, by a first wireless user device from a base station, configuration information associated with direct data transmission between the first wireless user device and one or more wireless user devices, wherein the configuration information comprises information of a resource selection mode for direct data transmission, and wherein the information of a resource selection mode indicates a resource pool from which the first wireless user device selects a resource for direct data transmission to one or more wireless user devices;
   mapping a first target identity to a first group identity, and mapping a second target identity to a second group identity, wherein the first target identity is associated with at least one target wireless user device of a first group of target wireless user devices, and wherein the second target identity is associated with at least one target wireless user device of a second group of target wireless user devices;
   transmitting, to the base station, a radio resource control (RRC) message comprising information of the first target identity and information of the second target identity; and
   transmitting, to the base station, a signal associated with a MAC-layer message, wherein the MAC-layer message comprises:
      a first field that indicates the first target identity and indicates the first group identity; and
      a second field that indicates the second target identity and indicates the second group identity.

2. The method of claim 1, further comprising:
   transmitting, to the base station, a different message comprising changed mapping information between the first group identity and a third target identity associated with at least one target wireless user device of a third group of target wireless user devices.

3. The method of claim 2, wherein the different message is associated with a resource scheduling by the base station, and wherein the resource scheduling indicates a resource for direct data transmission of the first wireless user device.

4. The method of claim 1, wherein the first target identity is configured to be identified by Proximity Service (ProSe) Layer-2 identity, and
   wherein ProSe layer-2 associated with the ProSe Layer-2 identity comprises Media Access Control (MAC) layer, Radio Link Control (RLC) layer, and Packet Data Convergence Protocol (PDCP) layer.

5. The method of claim 1, wherein the first group of target wireless user devices comprises a first plurality of target wireless user devices to receive direct data transmitted from the first wireless user device.

6. The method of claim 1, wherein the MAC-layer message comprises a buffer status report (BSR) associated with a plurality of target identities comprising the first target identity and the second target identity.

7. The method of claim 1, further comprising:
   receiving a System Information Block (SIB) message from the base station, wherein the SIB message comprises information supporting direct data transmission of the first wireless user device.

8. The method of claim 7, wherein the information supporting direct data transmission of the first wireless user device indicates whether a specific cell supports direct data transmission, and
   wherein the specific cell is associated with a frequency band through which the first wireless user device transmits data directly to one or more wireless user devices.

9. A first wireless user device comprising:
   a wireless transceiver to receive, from a base station, configuration information associated with direct data transmission between the first wireless user device and one or more wireless user devices, wherein the configuration information comprises information of a resource selection mode for direct data transmission, and wherein the information of a resource selection mode indicates a resource pool from which the first wireless user device selects a resource for direct data transmission to one or more wireless user devices; and
   a processor configured to map a first target identity to a first group identity, and to map a second target identity to a second group identity, wherein the first target identity is associated with at least one target wireless user device of a first group of target wireless user devices, and wherein the second target identity is associated with at least one target wireless user device of a second group of target wireless user devices,
   wherein the wireless transceiver transmits, to the base station, a radio resource control (RRC) message comprising information of the first target identity and information of the second target identity,
   wherein the wireless transceiver transmits, to the base station, a signal associated with a MAC-layer message, and
   wherein the MAC-layer message comprises:
      a first field that indicates the first target identity and indicates the first group identity; and
      a second field that indicates the second target identity and indicates the second group identity.

10. The first wireless user device of claim 9, wherein the wireless transceiver transmits, to the base station, a different message comprising changed mapping information between the first group identity and a third target identity associated with at least one target wireless user device of a third group of target wireless user devices.

11. The first wireless user device of claim 10, wherein the different message is associated with a resource scheduling by the base station, and wherein the resource scheduling indicates a resource for direct data transmission of the first wireless user device.

12. The first wireless user device of claim 9, wherein the first target identity is configured to be identified by Proximity Service (ProSe) Layer-2 identity, and wherein ProSe layer-2 associated with the ProSe Layer-2 identity comprises Media Access Control (MAC) layer, Radio Link Control (RLC) layer, and Packet Data Convergence Protocol (PDCP) layer.

13. The first wireless user device of claim 9, wherein the first group of target wireless user devices comprises a first plurality of target wireless user devices to receive direct data transmitted from the first wireless user device.

14. The first wireless user device of claim 9, wherein the MAC-layer message comprises a buffer status report (BSR) associated with a plurality of target identities comprising the first target identity and the second target identity.

15. The first wireless user device of claim 9, wherein the wireless transceiver receives a System Information Block (SIB) message from the base station, and wherein the SIB message comprises information supporting direct data transmission of the first wireless user device.

16. The first wireless user device of claim 15, wherein the information supporting direct data transmission of the first wireless user device indicates whether a specific cell supports direct data transmission, and wherein the specific cell is associated with a frequency band through which the first wireless user device transmits data directly to one or more wireless user devices.

* * * * *